(12) United States Patent
Hipshier (10) Patent No.: US 8,573,665 B2
(45) Date of Patent: *Nov. 5, 2013

(54) TRANSPARENT/TRANSLUCENT FLEXIBLE COMPONENT FOR A VEHICLE INTERIOR

(75) Inventor: Jason M. Hipshier, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/153,811

(22) Filed: Jun. 6, 2011

(65) Prior Publication Data

US 2011/0241371 A1 Oct. 6, 2011

Related U.S. Application Data (63) Continuation-in-part of application No. 12/582,878, filed on Oct. 21, 2009, now Pat. No. 7,954,871, and a continuation-in-part of application No. 11/943,283, filed on Nov. 20, 2007, now Pat. No. 8,007,020.

(60) Provisional application No. 61/107,167, filed on Oct. 21, 2008, provisional application No. 61/112,884, filed on Nov. 10, 2008.

(51) Int. Cl.
*B60J 1/20* (2006.01)

(52) U.S. Cl.
USPC ..................... 296/24.34; 296/37.8

(58) Field of Classification Search
USPC .............................. 296/24.34, 37.8
See application file for complete search history.

(56) References Cited

U.S. PATENT DOCUMENTS

| 6,406,169 | B1 | 6/2002 | Munsey |
| 7,201,432 | B2 | 4/2007 | Roth |
| 7,475,954 | B1 | 1/2009 | Latunski |
| 2006/0024476 | A1 | 2/2006 | Leland et al. |
| 2006/0037713 | A1 | 2/2006 | Ichimaru et al. |
| 2006/0186696 | A1 | 8/2006 | Dobos et al. |
| 2007/0056693 | A1 | 3/2007 | Szebeni |
| 2008/0129071 | A1 | 6/2008 | Hipshier et al. |
| 2009/0008955 | A1 | 1/2009 | Desoto |

FOREIGN PATENT DOCUMENTS

| DE | 40 10 241 A1 | 4/1991 |
| DE | 10 2005 023 062 B3 | 10/2006 |
| EP | 1 777 109 B1 | 4/2007 |
| JP | 03 068474 A | 3/1991 |

*Primary Examiner* — Joseph Pape (74) *Attorney, Agent, or Firm* — Dickinson Wright PLLC (57) ABSTRACT

A storage component 20 for a vehicle includes a flexible component 22, such as a tambour door, formed of a plurality of slats 26 supported by and chemically bonded to a substrate 24. The flexible component 22 is translucent or transparent, allowing light to pass therethrough. The slats 26 are formed of a slat polymer, such as polypropylene (PP), and the substrate 24 is formed of a substrate polymer, such as thermoplastic elastomer (TPE). The slats 26 also have a tensile strength of at least 5 MPa so that the flexible component 22 can support objects disposed on the flexible component 22, such as an arm of a passenger or a purse.

20 Claims, 5 Drawing Sheets

TRANSPARENT/TRANSLUCENT FLEXIBLE COMPONENT FOR A VEHICLE INTERIOR

CROSS REFERENCE TO RELATED APPLICATION

This application is a continuation-in-part of U.S. application Ser. No. 12/582,878, filed Oct. 21, 2009, which is a continuation-in-part of U.S. application Ser. No. 11/943,283 filed Nov. 20, 2007 and claims the benefit of U.S. Provisional Application Ser. No. 61/107,167, filed Oct. 21, 2008, and U.S. Provisional Application Ser. No. 61/112,884, filed Nov. 10, 2008. The disclosures of all applications are incorporated herein by reference in their entirety.

BACKGROUND OF THE INVENTION

1. Field of the Invention

This invention relates to a flexible component for storage component of a vehicle.

2. Description of the Prior Art

Automotive vehicles include numerous storage structures, such as consoles, located throughout the passenger compartment of the vehicle. For example, center consoles are typically disposed between front seats of the vehicle, and other types of consoles are often disposed along the doors or dashboard. Such consoles have doors to selectively close the storage area provided in the console. For example, an articulated or flexible door, known in the art as a tambour door, can be used to close an opening to the storage area. Tambour doors are particularly useful for closing an opening having a non-linear profile, because tambour doors can ride on tracks or rails that follow the non-linear profiles or contours of the opening. Typically, tambour doors include multiple slats or segments that fit into and ride on the tracks or rails. The consoles are often used as both a storage area and an arm rest. Passengers typically rest their arm on the door to the center console and also find it convenient to place personal items on the door.

SUMMARY OF THE INVENTION

The subject invention provides a flexible component for a storage component of a vehicle. The flexible component includes a substrate and a plurality of slats chemically coupled to the substrate. The substrate includes at least one substrate polymer and the slats include at least one slat polymer. The substrate and the slats each have a surface tension, and the surface tensions differ by not greater than 19 dynes per centimeter. At least a portion of the chemically coupled slats and substrate allow light to pass therethrough.

In one embodiment, the substrate polymer is selected from the group consisting of: thermoplastic polyurethane (TPU), thermoplastic elastomer (TPE), thermoplastic elastomeric olefin (TPO), thermoplastic polyolefin elastomer (TEO), silicon, polyvinyl chloride (PVC), polyurethane, and urethane; and the slat polymer is selected from the group consisting of: polypropylene (PP), polycarbonate (PC), acrylonitrile butadiene styrene (ABS), polycarbonate acrylonitrile butadiene styrene (PC/ABS), nylon, polybutylene terephthalate (PBT), silicon, and polyethylene terephthalate (PET).

The invention also provides a storage component for a vehicle comprising a flexible component. The storage component includes side walls presenting an interior space therebetween, and the side walls define an opening to the interior space. The flexible component is disposed along the opening. The flexible component includes a substrate and a plurality of slats chemically coupled to the substrate. The substrate includes at least one substrate polymer and the slats include at least one slat polymer. The substrate and the slats each have a surface tension, and the surface tensions differ by not greater than 19 dynes per centimeter. At least a portion of the chemically coupled slats and substrate allow light to pass therethrough.

Due to the strength of the slats and the translucent nature of the flexible component, the flexible component is strong enough to support objects placed thereon while simultaneously allows a passenger of the vehicle to view objects on the opposite side of the flexible component, for example items within the storage component.

BRIEF DESCRIPTION OF THE DRAWINGS

This patent or application file contains three photographs executed in color. Copies of this patent or patent application publication with color photographs will be provided by the Office upon request and payment of the necessary fee. Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

A storage component 20 of a vehicle, such as a center console, including a flexible component 22, such as a tambour door, is generally shown. At least a portion of the flexible component 22 is translucent, allowing light to pass therethrough. The flexible component 22 includes a substrate 24 coupled to a plurality of slats 26, which are formed of specific polymers that allow light to pass therethough. The materials of the flexible component 22, specifically the slats 26, are also strong enough to support objects placed on the flexible component 22, such as an arm of a passenger or a personal item, such as a purse. The flexible component 22 is typically disposed along an opening 28 to an interior space 30 of the storage component 20. It should be appreciated that, while the following disclosure of various exemplary embodiments of the flexible component 22 are directed to the tambour door of the center console, the flexible component 22 could be another type of door or cover. In addition, the flexible component 22 could be used for other types of applications, such as a gear shift closeout, steering column closeout, map pocket, door pocket, glove box, sunglass bin, or another enclosed area of the vehicle.

Figure 1:
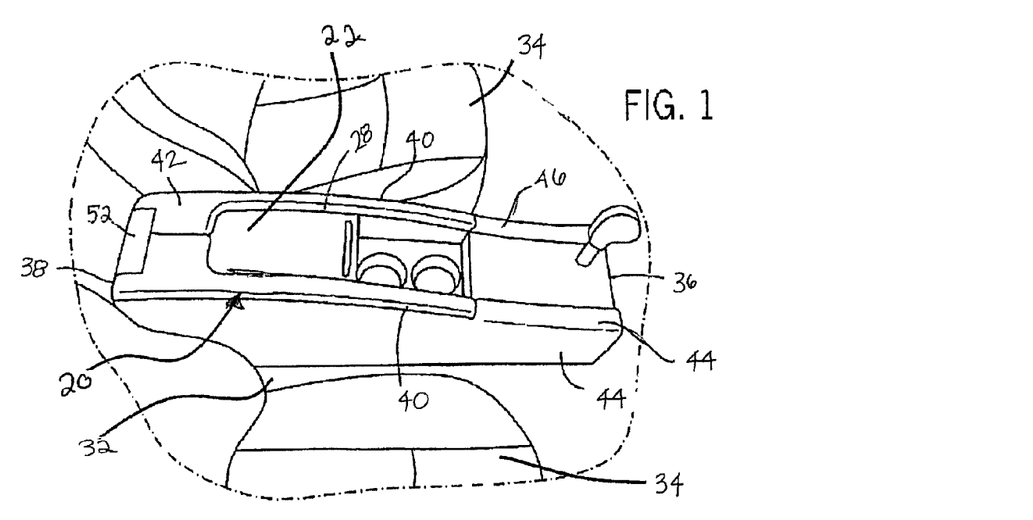
FIG. 1 is an isometric pictorial view of a console for a vehicle showing a flexible component, wherein the flexible component is a door in a closed configuration.
Figure 2:
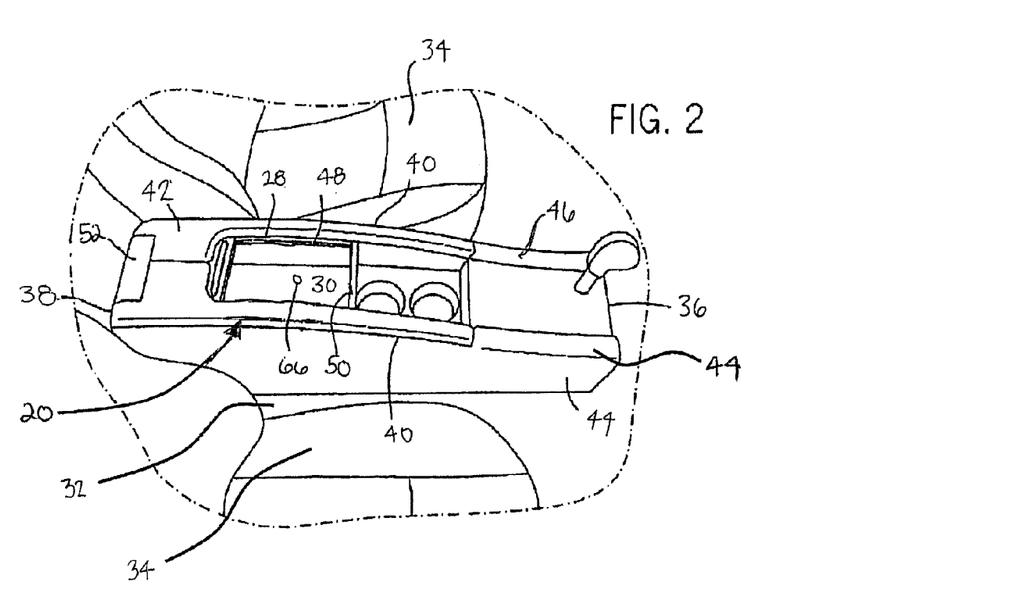
FIG. 2 is an isometric pictorial view of the console of FIG. 1 showing the flexible component in an open configuration.

FIGS. 1 and 2 show one exemplary embodiment of the storage component 20, specifically the center console of the vehicle. The console can be coupled to a vehicle floor 32 between two seats 34 or in any other suitable location. According to this exemplary embodiment, the console is configured to provide a storage area and an armrest for an occupant of one or both of the seats 34. The console can be a generally prismatic structure with a front wall 36, a rear wall 38, two opposed and generally symmetrical side walls 40 and a top surface 42.

The console of the exemplary embodiment includes two side panels 44. The side panels 44 can form the main body of the console. Each side panel 44 provides one of the side walls 40 of the console and portions of the rear wall 38, the front wall 36 and the top surface 42. The side walls 40 have an upper contour that is a compound curve having both convex and concave portions, such that each side wall 40 is substantially higher adjacent to the rear wall 38 than it is adjacent to the front wall 36. Top edges 46 of the side panels 44 form the curved top surface 42. The upper contour of the side walls 40 presents the opening 28 to the interior space 30 therebetween. The opening 28 allows a user to access the interior space 30 of the console. According to one exemplary embodiment, the flexible component 22 rides on a set of tracks 48 extending along the opening 28 to the console. The tracks 48 can have, for example, a C-shaped cross section and may be coupled to the side panels 44 or integrally formed within the side panels 44. At least one inner partition 50 can be provided in the interior space 30 of the console to present a bin or a liner. The console can also include a rear panel 52. The rear panel 52 can form a portion of the rear wall 38 or a portion of the top surface 42.

The console includes the flexible component 22, such as, for example, the tambour door, configured to close the opening 28 in the console, as shown in FIGS. 1 and 2. The flexible component 22 is disposed along the opening 28 to the interior space 30 of the console. The flexible component 22 may be cycled or selectively moved over and within a predetermined area, such as the opening 28 of the console. Because of the curved nature of the top surface 42, the flexible component 22 preferably is flexible or articulated. According to the exemplary embodiment, the flexible component 22 is a tambour door and rides on the tracks 48 having the C-shaped cross section. FIG. 1 shows the flexible component 22 in a closed configuration, and FIG. 2 shows the flexible component 22 in an open configuration.

Figure 3:
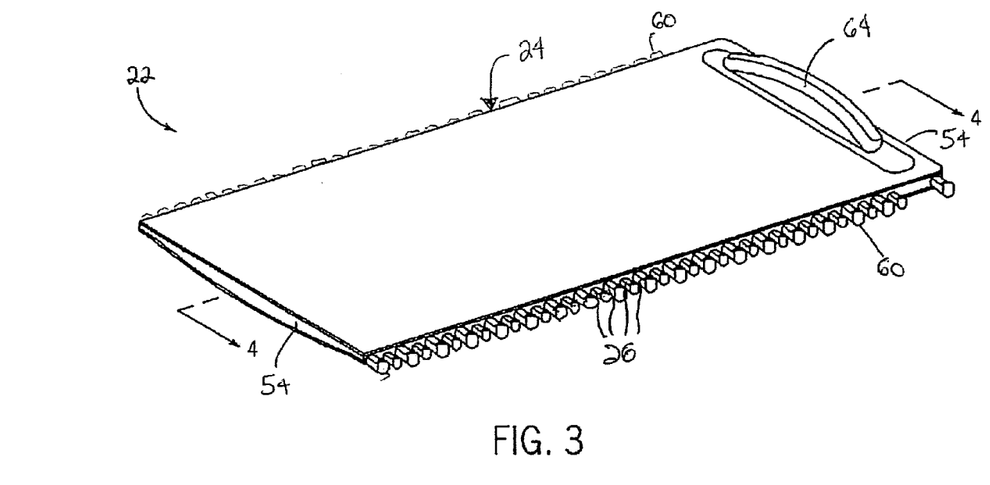
FIG. 3 is an isometric view of the flexible component according to an exemplary embodiment.
Figure 4:
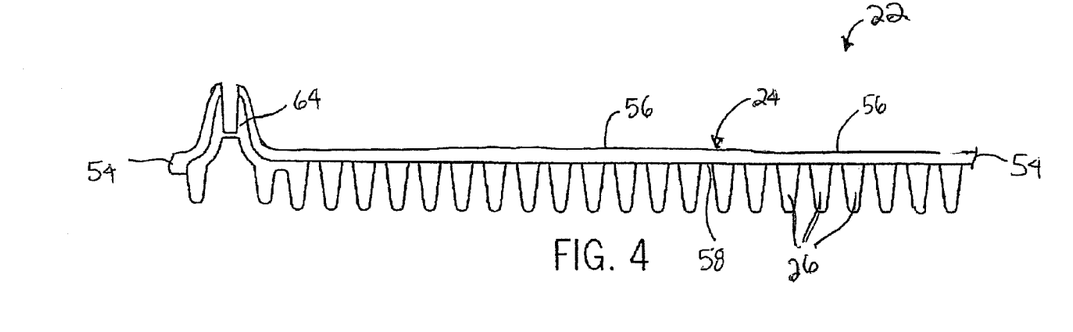
FIG. 4 is a sectional view of the flexible component of FIG. 3 taken along the line 4-4.
Figure 5:
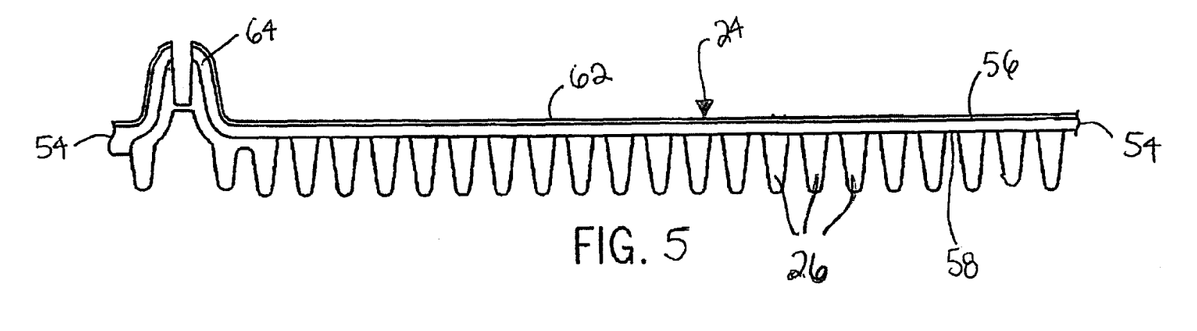
FIG. 5 is a sectional view of the flexible component of FIG. 4 with an additional layer.

FIGS. 3-8 show the flexible component 22 separate from the console. As shown in FIGS. 3-5, the flexible component 22 includes the substrate 24 extending longitudinally between opposite substrate ends 54. As shown in FIG. 3, the substrate 24 has a generally rectangular surface area. As shown in FIGS. 4 and 5, the substrate 24 has a generally rectangular and uniform cross section extending between the opposite substrate ends 54. The substrate 24 is coupled to, and preferably chemically bonded to the slats 26. In one embodiment, the substrate 24 spaces the slats 26 from one another and also couples the slats 26 to one another. In the embodiments of FIGS. 4 and 5, the substrate 24 provides an outer surface 56 of the flexible component 22 and a portion of an inner surface 58 of the flexible component 22. The geometry of the substrate 24 can vary, depending on the specific application and load requirements.

The slats 26 of the flexible component 22 extend longitudinally between opposite slat ends 60. As shown in FIGS. 3-5, the slats 26 are longitudinally aligned and generally parallel to one another. In one embodiment, the slats 26 are spaced from one another by the substrate 24. In another embodiment, the slats 26 are integral with one another and supported by the substrate 24. The slat ends 60 are configured to follow the tracks 48 along a path following the upper contour of the side walls 40. The geometry of the slats 26 can vary, depending on the specific application and load requirements.

As stated above, the flexible component 22 may be selectively moved over and within a predetermined area, such as along the opening 28 of the side walls 40, which renders the flexible component 22 useful in a variety of vehicle storage applications. The flexible component 22 may be used as a cover or door to various types of consoles, storage areas, or spaces in the vehicle interior. For example, the flexible component 22 may be used as a steering column closeout, in which case the flexible component 22 is selectively moved within a predetermined area adjacent the steering column. The flexible component 22 may also be used as a gear shift closeout, in which case the flexible component 22 is selectively moved within a predetermined area adjacent the gear shift.

At least a portion of the slats 26 or at least a portion of the substrate 24 of the flexible component 22 allows light to pass therethrough. For example, half of the slats 26 can allow light to pass therethrough while the other half of the slats 26 are opaque. In one embodiment, a portion of both the slats 26 and the substrate 24 allow light to pass therethrough. For example, a section of the flexible component 22 can include a design, such as a logo, allowing light to pass therethrough, while the remaining portion of the flexible component 22 is opaque. In another embodiment, either the slats 26 or the substrate 24 is opaque. In one preferred embodiment, all of the slats 26 and the entire substrate 24 allow light to pass therethrough.

The slats 26 and the substrate 24 can be considered translucent, so that light passes through the slats 26 and the substrate 24 diffusely, and the presence of objects on the other side of the flexible component 22 can be recognized. Alternatively, the slats 26 and the substrate 24 can be transparent, so that light passes through the slats 26 and the substrate 24 with little or no distortion, and objects on the other side of the flexible component 22 can be clearly seen. Thus, when the flexible component 22 is disposed along the opening 28 of the console, a passenger is able to recognize the presence of objects in the console, or even clearly see the objects in the console.

The substrate 24 and slats 26 are formed of materials allowing the flexible component 22 to be transparent or translucent. The substrate 24 and the slats 26 are typically formed of different materials, but can be formed of the same material. The substrate 24 includes at least one substrate polymer and the slats 26 include at least one slat polymer. The materials of the substrate 24 and the slats 26 are also selected so that the substrate 24 and slats 26 are compatible and can be chemically coupled to one another to provide the flexible component 22. The materials of the substrate 24 and slats 26, especially the slats 26, are also selected so that the substrate 24 and slats 26 are strong enough to support objects placed on the flexible component 22.

The slats 26 include the at least one slat polymer in an amount to affect the translucency, compatibility, strength, and other properties of the slats 26 and the flexible component 22. The slats 26 include the at least one slat polymer in an amount of at least 60 wt %, based on the total weight of the slats 26. In one embodiment, the slats 26 include the slat polymers in an amount of at least 70 wt %, or at least 80 wt %, or at least 90 wt %, or 100 wt %, based on the total weight of the slats 26. The slats 26 can be formed of a single slat polymer or can include a mixture of several different slat polymers.

The substrate 24 and the slats 26 can also include at least one filler in an amount not greater than 40 weight percent. In one embodiment, the substrate 24 includes at least one substrate filler in an amount to affect the translucency, compatibility, strength, and other properties of the substrate 24 and the flexible component 22. For example the substrate 24 can include the substrate fillers in an amount not greater than 40 wt %, based on the total weight of the substrate 24. In one embodiment, the substrate 24 includes the substrate fillers in an amount of not greater than 30 wt %, or not greater than 20 wt %, or not greater than 10 wt %, or 0 wt %, based on the total weight of the substrate 24. The substrate 24 can include a single substrate filler or can include a mixture of several different substrate fillers.

In one embodiment, the slats 26 include at least one slat filler in an amount to affect the translucency, compatibility, strength, and other properties of the slats 26 and the flexible component 22. The slats 26 include the slat filler in an amount not greater than 40 wt %, based on the total weight of the slats 24. In one embodiment, the slats 26 include the slat fillers in an amount of not greater than 30 wt %, or not greater than 20 wt %, or not greater than 10 wt %, or 0 wt %, based on the total weight of the slats 26. The slats 26 can include a single slat filler or can include a mixture of several different slat fillers.

The substrate polymers, substrate fillers, slat polymers, and slat fillers are selected so that the slats 26 and the substrate 24 have surface tensions allowing the slats 26 and substrate 24 to be chemically coupled to one another. The slats 26 and the substrate 24 each have a surface tension, which can be measured according to ASTM D2578-09. The surface tension of the substrate 24 and the surface tension of the slats 26 differ by not greater than 19 dynes per centimeter. The similar or equal surface tensions allow the slats 26 and the substrate 24 to be chemically coupled or bonded to one another. If the surface tensions of the slats 26 and substrate 24 differ by more than 19 dynes per centimeter, the slats 26 and substrate 24 may not be sufficiently bonded to one another, or may not bond at all. In one embodiment, the surface tensions of the slats 24 and the substrate 26 differ by not greater than 15 dynes per centimeter, more preferably not greater than 10 dynes per centimeter, or not greater than 5 dynes per centimeter, or not greater than 2 dynes per centimeter. In one embodiment, the slats 26 have a surface tension of 38 dynes per centimeter to 50 dynes per centimeter. In another embodiment, the slats 26 have a surface tension of 18 dynes per centimeter to 37 dynes per centimeter.

As stated above, the substrate polymers and the slat polymers are selected so that the flexible component 22 is strong enough to support objects placed on the flexible component 22, such as an arm of a passenger or a purse.

In one embodiment, the slats 26 have a tensile strength of at least 5 MPa when tested according to test method ISO R527-2. In another embodiment, the slats 26 have a tensile strength of at least 9 MPa, or at least 20 MPa, or at least 30 MPa, or at least 50 MPa, or at least 60 MPa. In one embodiment, the slats 26 have a tensile strength greater than a tensile strength of the substrate 24.

In one embodiment, the slats 26 have a notched izod impact strength at 23° C. of at least 35 kJ/m$^2$ when tested according to test method ISO 180. In another embodiment, the slats 26 have a notched izod impact strength at 23° C. of at least 45 kJ/m$^2$, or at least 55 kJ/m$^2$, or at least 65 kJ/m$^2$. In one embodiment, the slats 26 have a notched izod impact strength greater than a notched izod impact strength of the substrate 24.

In one embodiment, the slats 26 have a flexural modulus of 600 MPa to 1,400 MPa when tested according to test method ISO 178. In another embodiment, the slats 26 have a flexural modulus of 700 MPa to 1,300 MPa, or 800 to 1,200 MPa, or 900 to 1,000 MPa. In one embodiment, the slats 26 have a flexural modulus greater than a flexural modulus of the substrate 24.

In one embodiment, the slats 26 have a hardness of at least 50 when tested according to ISO 868, with Durometer Shore A and a 15 second delay. In another embodiment, the slats 26 have a hardness of at least 60 or at least 65. In one embodiment, the slats 26 have a hardness greater than a hardness of the substrate 24.

In one embodiment, the substrate 24 has a tensile strength of at least 5 MPa when tested according to test method ISO R527-2. In another embodiment, the substrate 24 has a tensile strength of at least 9 MPa, or at least 20 MPa, or at least 30 MPa, or at least 50 MPa, or at least 60 MPa. In one embodiment, the substrate 24 has a tensile strength greater than a tensile strength of the slats 26.

In one embodiment, the substrate 24 has a notched izod impact strength at 23° C. of at least 35 kJ/m$^2$ when tested according to test method ISO 180. In another embodiment, the substrate 24 has a notched izod impact strength at 23° C. of at least 45 kJ/m$^2$, or at least 55 kJ/m$^2$, or at least 65 kJ/m$^2$. In one embodiment, the substrate 24 has a notched izod impact strength greater than a notched izod impact strength of the slats 26.

In one embodiment, the substrate 24 has a flexural modulus of 600 MPa to 1,400 MPa when tested according to test method ISO 178. In another embodiment, the substrate 24 has a flexural modulus of 700 MPa to 1,300 MPa, or 800 to 1,200 MPa, or 900 to 1,000 MPa. In one embodiment, the substrate 24 has a flexural modulus greater than a flexural modulus of the slats 26.

In one embodiment, the substrate 24 has a hardness of at least 50 when tested according to ISO 868, with Durometer Shore A and a 15 second delay. In another embodiment, the substrate 24 has a hardness of at least 60 or at least 65. In one embodiment, the substrate 24 has a hardness greater than a hardness of the slats 26.

Examples of the substrate polymers include, but are not limited to, thermoplastic polyurethane (TPU), thermoplastic elastomer (TPE), thermoplastic elastomeric olefin (TPO), thermoplastic polyolefin elastomer (TEO), silicon, polyvinyl chloride (PVC), urethane, polypropylene (PP), polycarbonate (PC), acrylonitrile butadiene styrene (ABS), polycarbonate acrylonitrile butadiene styrene (PC/ABS), nylon, polybutylene terephthalate (PBT), and polyethylene terephthalate (PET). In one embodiment, the substrate polymers include at least one of thermoplastic polyurethane (TPU), thermoplastic elastomer (TPE), thermoplastic elastomeric olefin (TPO), thermoplastic polyolefin elastomer (TEO), silicon, polyvinyl chloride (PVC), and urethane.

In one preferred embodiment, the substrate 24 includes a single substrate polymer in an amount of at least 60 wt %, based on the total weight of the substrate 24, and the substrate polymer is selected from the group consisting of thermoplastic polyurethane (TPU), thermoplastic elastomer (TPE), thermoplastic elastomeric olefin (TPO), thermoplastic polyolefin elastomer (TEO), silicon, polyvinyl chloride (PVC), and urethane.

In one preferred embodiment, the substrate 24 is formed entirely of a single homogeneous material, including the substrate polymers and optionally the substrate fillers. For example, the substrate 24 can include a single homogeneous material comprising the substrate polymer in an amount of 100 wt %, based on the total weight of the substrate 24, wherein the substrate polymer is a thermoplastic elastomer (TPE). Other examples of homogenous materials that can be used to form the substrate 24 are provided in Examples 1-3 below. Physical and chemical property data for the materials is also provided. The values for the properties listed can vary by +/−10 percent. Alternatively, the materials used to form the substrate 24 are listed in Examples 4-12, below.

Example 1

100 wt % polyvinyl chloride (PVC)

| Test Method | Spec. Range | Results |
|---|---|---|
| Specific Gravity, g/cm³, max. ISO 1183, Method A, ASTM D792, Method A | 1.35 | 1.31 |
| Hardness, Durometer Shore A, 15 sec. delay, ISO 868, ASTM D2240 | 65 ± 5 | 66 |
| Tensile Strength, MPa min. 500 mm/min. speed ISO R527, Type 2, ASTM D638, Type M-II | 9.6 | 10.0 |
| Elongation at Break, % min. ISO R527, Type 2, ASTM D638, Type M-II | 300 | 389 |
| Tear Strength, kN/m, Die C ISO 34, Method B, Procedure A, ASTM D624, Die C | 26 | 27.4 |
| Cold Flexibility @−34° C. 19-20 mm Mandrel FLTM BN 102-01 | No Cracking | No Cracks |
| Soiling and Cleanability, FLTM BN 112-01 | None | Pass |
| Color Stability, 168 hrs @ 100° C. ± 2° C. ISO 188, ASTM D573 | 4 AATCC | 4-5 AATCC |
| Heat Aging Performance, 150 ± 50 air changes/h, 1000 h @ 85° C. ± 2° C., ISO 188, ASTM D573 | | |
| Tensile Strength Change, % | ±15% of original value | +2 |
| Elongation Change, % | ±15% of original value | −8 |
| Weight Change, % max | 2% of original value | 1.2 |

Example 2

100 wt % thermoplastic elastomericolefin (TEO)

| Typical Properties | Method | Value | Unit |
|---|---|---|---|
| Physical | | | |
| Melt flow rate (230° C./2.16 kg) | ASTM D 1238 | 18 | g/10 min |
| Density (23° C.) | ISO 1183 | 0.90 | g/cm³ |
| Mechanical | | | |
| Tensile Stress at Yield (23° C.) | ISO 527-1, -2 | 20 | MPa |
| Tensile Strain at Yield (23° C.) | ISO 527-1, -2 | 5 | % |
| Flexural modulus (23° C.) | ISO 178 | 1035 | MPa |
| Impact | | | |
| Charpy notched impact strength | ISO 179 | | |
| (−40° C.) | | 4.3 | kJ/m² |
| (23° C.) | | 26 | kJ/m² |
| Notched izod impact strength | ISO 180 | | |
| (23° C.) | | 31 | kJ/m² |
| (−40° C.) | | 4.6 | kJ/m² |
| Thermal | | | |
| Heat deflection temperature B (0.45 MPa) Unannealed | ISO 75B-1, -2 | 73 | ° C. |
| Heat deflection temperature A (1.80 MPa) Unannealed | ISO 75A-1, -2 | 48 | ° C. |
| Additional Information | | | |
| Mold shrinkage | ISO 294-4 | | |

Example 3

100 wt % thermoplastic elastomer (TPE)

| Test Method | Results |
|---|---|
| Specific Gravity; ASTM D792 | 0.96 |
| Hardness, Shore A, 15 s delay; ASTM D22-40 | 82 |
| Tensile Strength, MPa min. ISO 37, 500 mm/mn | 13 |
| Elongation @ Break, % min. ISO 37, 500 mm/min | 790 |
| Tensile Stress @ 100%, MPa min. ISO 37, 500 mm/min | 3.2 |
| Tear Strength, kN/m min. ISO 34, 500 mm/min | 47.4 |
| Cold Flexibility @−30° C., FLTM BN102-01 | Pass |
| Compression Set, ASTM D395, % max. | |
| 168 hrs at 100° C. | 58 |
| 168 hrs at 23° C. | 43 |
| Fogging, SAE J1756, % min. 6 hrs at 95° C. and 38° C. | 98 |
| Flammability, FMVSS302, mm/min max. | 61 |
| Properties after heat aging, ASTM D412, 1008 hrs at 100° C. | |
| Retention in Tensile, % | 97 |
| Retention in Elongation, % | 85 |

| Weathering | Resistance |
|---|---|
| Interior Xenon, SAE J1885, 1240 kJ/m² | ΔE = 0.57 Pass (Black only) |
| Exterior Xenon Arc 2500 kJ/m² SAE J1960 | ΔE = 0.30 Pass (Black only) |
| 2 yrs Florida, SAE J1976*, ** | ΔE = 0.33 Pass (Black only) |
| 2 yrs Arizona, SAE J1976*, ** | ΔE = 0.22 Pass (Black only) |

Examples of the slat polymers include, but are not limited to, thermoplastic polyurethane (TPU), thermoplastic elastomer (TPE), thermoplastic elastomeric olefin (TPO), thermoplastic polyolefin elastomer (TEO), silicon, polyvinyl chloride (PVC), urethane, polypropylene (PP), polycarbonate (PC), acrylonitrile butadiene styrene (ABS), polycarbonate acrylonitrile butadiene styrene (PC/ABS), nylon, polybutylene terephthalate (PBT), and polyethylene terephthalate (PET). In one embodiment, the slat polymers include at least one of polypropylene (PP), polycarbonate (PC), acrylonitrile butadiene styrene (ABS), polycarbonate acrylonitrile butadiene styrene (PC/ABS), nylon, polybutylene terephthalate (PBT), and polyethylene terephthalate (PET). In one preferred embodiment, the slats 26 includes a single slat polymer in an amount of at least 60 wt %, based on the total weight of the slats 26, and the slat polymer is selected from the group consisting of polypropylene (PP), polycarbonate (PC), acrylonitrile butadiene styrene (ABS), polycarbonate acrylonitrile butadiene styrene (PC/ABS), nylon, polybutylene terephthalate (PBT), and polyethylene terephthalate (PET).

In one preferred embodiment, the slats 26 include a single slat filler in an amount of 30 wt % of the slats 26. Examples of the slat fillers include, but are not limited to, glass, fiberglass, talc, and wood. The slats 26 can include a single slat filler or a mixture of the slat fillers.

In one preferred embodiment, the slats 26 are formed entirely of a single homogeneous material, including the slat polymers and optionally the slat fillers. For example, the slats 26 can include a single homogeneous material comprising 100 wt % of the slat polymer, based on the total weight of the slats 26, wherein the slat polymer is polypropylene homopolymer. Another example includes the slats 26 formed entirely of a homogeneous material including 70 wt % slat polymer and 30 wt % slat filler, wherein the slat polymer is polypropylene homopolymer and the slat filler is fiberglass. Other examples of materials that can be used to form the slats 26 are provided in Examples 4-12 below. Physical and chemical property data for the materials of Examples 4-12 is also provided. The values for the properties listed can vary by +/−10 percent. Alternatively, the materials used to form the slats 26 are listed in Examples 1-3, above.

Example 4

40% mica reinforced polypropylene homopolymer

| Physical Properties | Typical Values | Test Method |
|---|---|---|
| Melt Flow | 8 g/10 min | ISO 1133 |
| Filler Content | 40% | ISO 3451 |
| Density | 1.23 g/cm³ | ISO 1183 |
| Notched Izod Impact @ 23° C. | 2.1 kJ/m² | ISO 180 |
| Tensile Strength @ Ultimate (5 mm/minute) | 30 MPa | ISO 527 |
| Flexural Modulus (2 mm/minute) | 6,100 MPa | ISO 178 |
| Flexural Strength (2 mm/minute) | 50 MPa | ISO 178 |
| Deflection Temperature @ 455 KPa | 130° C. | ISO 75 |

Example 5

100% Polypropylene Copolymer

| Typical Properties | Method | Value Unit |
|---|---|---|
| Physical | | |
| Melt flow rate (230° C./2.16 kg) | ASTM D 1238 | 18 g/10 min |
| Density (23° C.) | ISO 1183 | 0.90 g/cm³ |
| Mechanical | | |
| Tensile Stress at Yield (23° C.) | ISO 527-1, -2 | 20 MPa |
| Tensile Strain at Yield (23° C.) | ISO 527-1, -2 | 5% |
| Flexural modulus (23° C.) | ISO 178 | 1035 MPa |
| Impact | | |
| Charpy notched impact strength | ISO 179 | |
| (−40° C.) | | 4.3 kJ/m² |
| (23° C.) | | 26 kJ/m² |
| Notched izod impact strength | ISO 180 | |
| (23° C.) | | 31 kJ/m² |
| (−40° C.) | | 4.6 kJ/m² |
| Thermal | | |
| Heat deflection temperature B (0.45 MPa) Unannealed | ISO 75B-1, -2 | 73° C. |
| Heat deflection temperature A (1.80 MPa) Unannealed | ISO 75A-1, -2 | 48° C. |
| Additional Information | | |
| Mold shrinkage | ISO 294-4 | |

Example 6

30 wt % fiberglass reinforced polypropylene homopolymer

| Physical Properties | Typical Values | Test Method |
|---|---|---|
| Melt Flow | 4.5 g/10 min | ASTM D1238 ISO 1133 |
| Filler Content | 30% | ASTM D5630 ISO 3451 |
| Density/Specific Gravity | 1.11 | ASTM D792 ISO 1183 |
| ASTM Testing | | |
| Notched Izod Impact @ 23° C. | 89 J/m | ASTM D256 |
| Un-notched Izod Impact @ 23° C. | 550 J/m | ASTM D256 |
| Tensile Strength @ Yield (5 mm/minute) | 75 MPa | ASTM D638 |
| Tensile Elongation @ Ultimate (5 mm/minute) | 6% | ASTM D638 |
| Tensile Strength @ Yield (50 mm/minute) | 80 MPa | ASTM D638 |
| Flexural Modulus (1.27 mm/minute) | 4,900 MPa | ASTM D790 |
| Flexural Secant Modulus (1.27 mm/minute) | 5,000 MPa | ASTM D790 |
| Deflection Temperature @ 264 psi | 145° C. | ASTM D648 |
| 66 psi | 155° C. | |
| ISO Testing | | |
| Notched Izod Impact @ 23° C. | 8 kJ/m² | ISO 180 |
| Notched Izod Impact @ −40° C. | 6 kJ/m² | ISO 180 |
| Notched Charpy Impact @ 23° C. | 8 kJ/m² | ISO 179 |
| Tensile Strength @ Yield (5 mm/minute) | 75 MPa | ISO 527 |
| Tensile Strength @ Yield (50 mm/minute) | 80 MPa | ISO 527 |
| Flexural Modulus (2 mm/minute) | 5,100 MPa | ISO 178 |
| Deflection Temperature @ 1820 KPa 455 KPa | 145° C. 155° C. | ISO 75 |
| Deflection Temperature @ 1820 KPa (Flatwise) | 140° C. | ISO 75 |

Example 7

20 wt % long glass fiber polypropylene

| Properties | Test Method | Units | Value |
|---|---|---|---|
| Density | ISO1183 | (g/cm³) | 1.01 |
| Mechanical | | | |
| Tensile Strength | ISO 527 | MPa | 88 |
| Elongation at Break | ISO 527 | % | 2.8 |
| Tensile Modulus | ISO 527 | MPa | 4600 |
| Flexural Strength | ISO 178 | MPa | 145 |
| Flexural Modulus | ISO 178 | MPa | 4625 |
| Notched Charpy Impact | ISO 179 | kJ/m² | 19 |

Example 8

100 wt % polycarbonate acrylonitrile butadiene styrene

| Physical | Nominal Value (SI) | Test Method |
|---|---|---|
| Density | 1.13 g/cm³ | ISO 1183/B |
| Melt Mass-Flow Rate (MFR) (260° C./3.8 kg) | 18 g/10 min | ISO 1133 |
| Molding Shrinkage | 0.50 to 0.70% | ISO 294-4 |
| Water Absorption (73° F. (23° C.), 24 hr) | 0.15% | ISO 62 |

| Mechanical | Nominal (SI) | Test Method |
|---|---|---|
| Tensile Modulus | | ISO 527-2 |
| 0.157 in (4.00 mm), Injection Molded | 2330 MPa | |
| Tensile Stress | | ISO 527-2/50 |
| Yield, 0.157 in (4.00 mm), Injection Molded | 57.0 MPa | |
| Break, 0157 in (4.00 mm), Injection Molded | 47.0 MPa | |
| Tensile Strain | | ISO 527-2/50 |
| Yield, 0.157 in (4.00 mm), Injection Molded | 4.5% | |
| Break, 0.157 in (4.00 mm), Injection Molded | 90% | |
| Flexural Modulus | | ISO 178[1] |
| 0.157 in (4.00 mm), Injection Molded | 2400 MPa | |
| Flexural Strength | | ISO 178[1] |
| 0.157 in (4.00 mm), Injection Molded | 90.0 MPa | |

| Impact | Nominal (SI) | Test Method |
|---|---|---|
| Notched Izod Impact Strength | | ISO 180/A |
| −22° F. (−30° C.) | 47.0 kJ/m² | |
| 73° F. (23° C.) | 63.0 KJ/m² | |

| Thermal | Nominal Value (SI) | Test Method |
|---|---|---|
| Heal Deflection Temperature | | |
| 66 psi (0.45 MPa), Unannealed | 130° C. | ISO 75-2B |
| 264 psi (1.8 MPa), Unannealed | 106° C. | ISO 75-2/A |
| Vicat Softening Temperature | | |
| — | 142° C. | ISO 306/A120 |
| — | 129° C. | ISO 306/B50 |

| Flammability | Nominal Value (SI) | Test Method |
|---|---|---|
| Burning Rate | <100 mm/min | ISO 3795 |
| FMVSS Flammability | <100 mm/min | FMVSS 302 |

Example 9

100 wt % polycarbonate

| | Nominal (SI) Value | Test Method |
|---|---|---|
| Physical | | |
| Density | 1.18 g/cm³ | ASTM D792 |
| | | ISO 1183/B |
| Melt Index (300° C./1.2 kg) | 18 g/10 min | ASTM D1238 |
| | | ISO 1133 |
| Molding Shrinkage - Flow | 0.60 to %0.80 | ASTM D955 |
| | | ISO 294-4 |
| Mechanical | | |
| Tensile Strength | | |
| Yield | 57.9 MPa | ASTM D638[1] |
| Yield | 58.0 MPa | ISO 527-2/50 |
| Tensile Elongation (Break) | 110% | ISO 527-2/50 |
| | | ASTM D638[1] |
| Flexural Modulus | | |
| — | 2280 MPa | ASTM D790[2] |
| — | 2270 MPa | ISO 178[3, 4] |
| Flexural Strength | | |
| — | 89.6 MPa | ASTM D790[2] |
| — | 90.0 MPa | ISO 178[3, 4] |
| Impact | | |
| Notched Izod Impact | | |
| 73° F. (23° C.) | 641 J/m | ASTM D256 |
| 73° F. (23° C.) | 641 kJ/m² | ISO 180/4A |
| Instrumented Dart Impact | | ASTM D3763[5] |
| 73° F. (23° C.) Total Energy | 50.8 J | |
| Tensile Impact Strength | 588 kJ/m² | ASTM D1822 |
| Thermal | | |
| Deflection Temperature Under Load | | ASTM D648 |
| | | ISO 75-2/A |
| 264 psi (1.8 MPa), Unannealed | 121° C. | |
| 264 psi (1.8 MPa), Annealed | 136° C. | |
| Vicat Softening Temperature | 146° C. | ISO 306/B50 |
| | | ASTM D1525[6] |
| Flammability | | |
| Flame Rating - UL | | UL 94 |
| 0.0625 in (1.59 mm) | HB | |
| 0.125 in (3.18 mm) | HB | |

Example 10

100 wt % acrylonitrile butadiene styrene

| | Nominal Value (SI) | Test Method |
|---|---|---|
| Physical | | |
| Density | | |
| — | 1.04 g/cm³ | ASTM D792 |
| — | 1.05 g/cm³ | ISO 1183/B |
| Apparent Density | 0.65 g/cm³ | ISO 60 |
| Melt Index | | |
| 230° C./3.8 kg | 2.5 g/10 min | ASTM D1238 |
| 220° C./10.0 kg | 10 g/10 min | ISO 1133 |
| Melt Volume-Flow Rate (MVR) (220° C./10.0 kg) | 11.0 cm³/10 min | ISO 1133 |
| Molding Shrinkage | | |
| Flow | 0.40 to 0.70% | ASTM D955 |
| — | 0.40 to 0.70% | ISO 294-4 |
| Mechanical | | |
| Tensile Modulus | | |
| — | 2070 MPa | ASTM D638[1] |
| 0.126 in (3.20 mm), Injection Molded | 2200 MPa | ISO 527-2 |
| Tensile Strength | | |
| Yield | 42.3 MPa | ASTM D638[1] |
| Yield, 0.126 in (3.20 mm), Injection Molded | 43.0 MPa | ISO 527-2/50 |
| Tensile Strain | | |
| Yield, 0.126 in (3.20 mm), Injection Molded | 3.3% | ISO 527-2/50 |
| Break | 25% | ASTM D638[1] |
| Flexural Modulus | | |
| — | 2210 MPa | ASTM D790[2] |
| 0.126 in (3.20 mm), Injection Molded | 2100 MPa | ISO 178[3, 4] |

-continued

| | Nominal Value (SI) | Test Method |
|---|---|---|
| Flexural Strength | | |
| — | 64.5 MPa | ASTM D790[2] |
| 0.126 in (3.20 mm), Injection Molded Elastomers | 65.0 MPa | ISO 178[3, 4] |
| Fogging (212° F. (100° C.)) | 98% | ISO 6452[5] |

Example 11

50 wt % polybutylene terephthalate (PBT) and 50 wt % polyethylene terephthalate (PET)

| TYPICAL PROPERTIES | TYPICAL VALUE | UNIT | STANDARD |
|---|---|---|---|
| MECHANICAL | | | |
| Tensile Stress, yld, Type I, 50 mm/min | 51 | MPa | ASTM D 638 |
| Tensile Strain, brk, Type I, 50 mm/min | 300 | % | ASTM D 638 |
| Flexural Stress, yld, 1.3 mm/min, 50 mm span | 82 | MPa | ASTM D 790 |
| Flexural Modulus, 1.3 mm/min. 50 mm span | 2340 | MPa | ASTM D 790 |
| Hardness, Rockwell R | 117 | — | ASTM D 785 |
| IMPACT | | | |
| Izod Impact, unnotched, 23° C. | 1602 | J/m | ASTM D 4812 |
| Izod Impact, notched, 23° C. | 53 | J/m | ASTM D 256 |
| Modified Gardner, 23° C. | 40 | J | ASTM D 3029 |
| THERMAL | | | |
| HDT, 0.45 MPa, 6.4 mm, unannealed | 154 | ° C. | ASTM D 648 |
| HDT, 1.82 MPa, 6.4 mm, unannealed | 54 | ° C. | ASTM D 648 |
| CTE, −40° C. to 40° C., flow | 8.1E−05 | 1/° C. | ASTM E 831 |
| CTE, 60° C. to 138° C. flow | 1.39E−04 | 1/° C. | ASTM E 831 |
| PHYSICAL | | | |
| Specific Gravity | 1.31 | — | ASTM D 792 |
| Specific Volume | 0.76 | cm$^3$/g | ASTM D 792 |
| Water Absorption, 24 hours | 0.08 | % | ASTM D 570 |
| Mold Shrinkage, flow, 0.75-2.3 mm | 0.9-1.5 | % | SABIC Method |
| Mold Shrinkage, flow, 2.3-4.6 mm | 1.5-2.3 | % | SABIC Method |
| Mold Shrinkage, xflow, 0.75-2.3 mm | 1-1.7 | % | SABIC Method |
| Mold Shrinkage, xflow, 2.3-4.6 mm | 1.6-2.4 | % | SABIC Method |
| ELECTRICAL | | | |
| Volume Resistivity | >4.E+16 | Ohm-cm | ASTM D 257 |
| Dielecric Strength, in oil, 1.6 mm | 23.2 | kV/mm | ASTM D 149 |
| Relative Permittivity, 100 Hz | 3.3 | — | ASTM D 150 |
| Relative Permittivity, 1 MHz | 3.1 | — | ASTM D 150 |
| Dissipation Factor, 100 Hz | 0.002 | — | ASTM D 150 |
| Dissipation Factor, 1 MHz | 0.02 | — | ASTM D 150 |

Example 12

100 wt % nylon

| Physical | Nominal Value | Unit | Test Method |
|---|---|---|---|
| Density | 1.31 | g/cm$^3$ | ISO 1183 |
| Ash Content | 30.00 | % | ISO 3451-4 |
| Moisture Content | 0.20 | % | ISO 15512 |
| Mechanical | Nominal Value | Unit | Test Method |
| Tensile Strength @ Yield | 175.00 | MPa | ISO 527, 50 mm |

-continued

| | | | |
|---|---|---|---|
| Flexural Strength @ Yield | 230.00 | MPa | ISO 178 |
| Flexural Modulus | 9.50 | Gpa | ISO 178 |
| Impact | Nominal Values | English | Test Method |
| Notched Charpy Impact | 7.00 | kj/m$^2$ | ISO 179-1, 2 |

The slats 26 are preferably formed of slat polymers that are different from the substrate polymers, and the slats 26 and the substrate 24 preferably have different compositions and properties. In one preferred embodiment, the slats 26 have a tensile strength, notched izod impact strength, hardness, and flexural modulus greater than the tensile strength, notched izod impact strength, hardness, and flexural modulus of the substrate 24, when tested according to the same methods, such as one of the methods listed above. In another embodiment, at least one of the tensile strength, notched izod impact strength, hardness, and flexural modulus of the slats 26 is greater than the same property of the substrate 24, when tested according to the same method, such as one of the methods listed above. In an alternate embodiment, the substrate polymers and slat polymers are the same, and the substrate 24 and slats 26 have the same composition and properties. For example, both the slats 26 and the substrate 24 can be formed of silicon.

As stated above, the substrate polymers and substrate fillers used to form the substrate 24 are compatible with the slat polymers and slat fillers used to form the slats 26 so that the slats 26 and the substrate 24 can be chemically coupled or molded together, which depends on the slats 26 and substrate 24 having similar surface tensions.

For example, the slats 26 can be formed polypropylene (PP) having a surface tension of 30 dynes per centimeter and the substrate 24 can be formed of thermoplastic elastomer (TPE) having a surface tension of 32 dynes per centimeter. In a second example, the slats 26 are formed of polycarbonate (PC) having a surface tension of 42 dynes per centimeter and the substrate 24 is formed of thermoplastic polyurethane (TPU) have a surface tension of 43 dynes per centimeter. In a third example, the slats 26 are formed of polycarbonate (PC) having a surface tension of 42 dynes, acrylonitrile butadiene styrene (ABS) having a surface tension of 42 dynes per centimeter, or polycarbonate acrylonitrile butadiene styrene (PC/ABS) having a surface tension of 42 dynes per centimeter; and the substrate 24 is formed of thermoplastic polyurethane (TPU) have a surface tension of 43 dynes per centimeter. In a forth example, the slats 26 are formed polypropylene (PP) having a surface of 30 dynes per centimeter and the substrate 24 is formed of thermoplastic elastomeric olefin (TPO) having a surface tension of 31 dynes per centimeter.

Other materials commonly used to form the substrate 24 include polyvinyl chloride (PVC) having a surface tension of 40 dynes per centimeter and polyvinyl chloride (PVC) having a surface tension of 33 dynes per centimeter. Other materials commonly used to form the slats 26 include nylon having a surface tension of 44 dynes per centimeter and polybutylene terephthalate (PBT) having a surface tension of 45 dynes per centimeter.

The flexible component 22 may include at least one additional layer 62, as shown in FIG. 5. The additional layer 62 may be an ink layer or a top coat layer, as outlined in the incorporated U.S. application Ser. No. 11/943,283. Such additional layers 62 may be translucent or opaque and may alter the appearance of the flexible component 22. For example, the flexible component 22 may include an ink layer that provides an opaque design on top of the otherwise translucent flexible component 22. The flexible component 22 may also include a protrusion 64 on one end that allows a user to more easily grasp and manipulate the flexible component 22. According to other exemplary embodiments, the flexible component 22 may include a depression, recession or hole to allow a user to more easily grasp and manipulate the flexible component 22.

Figure 6:
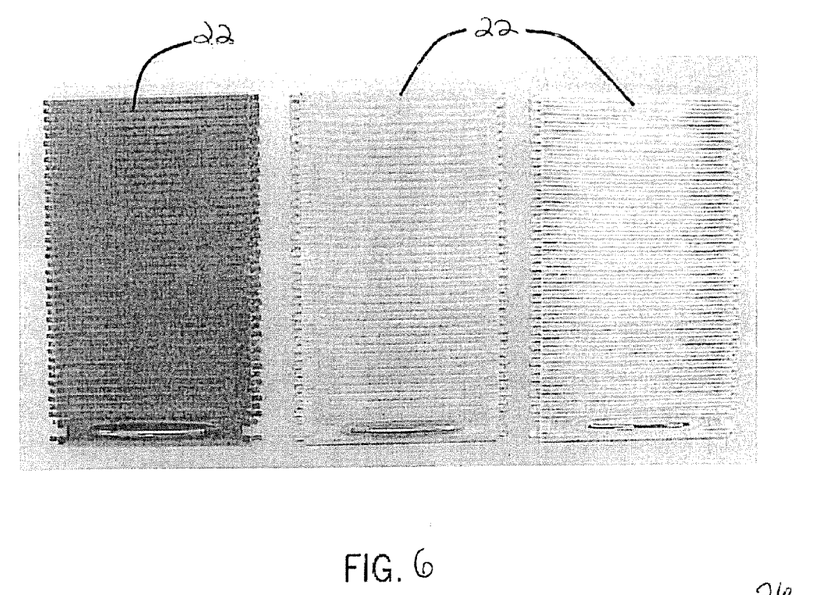
FIG. 6 is a photograph of three flexible components according to exemplary embodiments showing the flexible components in a first lighting configuration.
Figure 7:
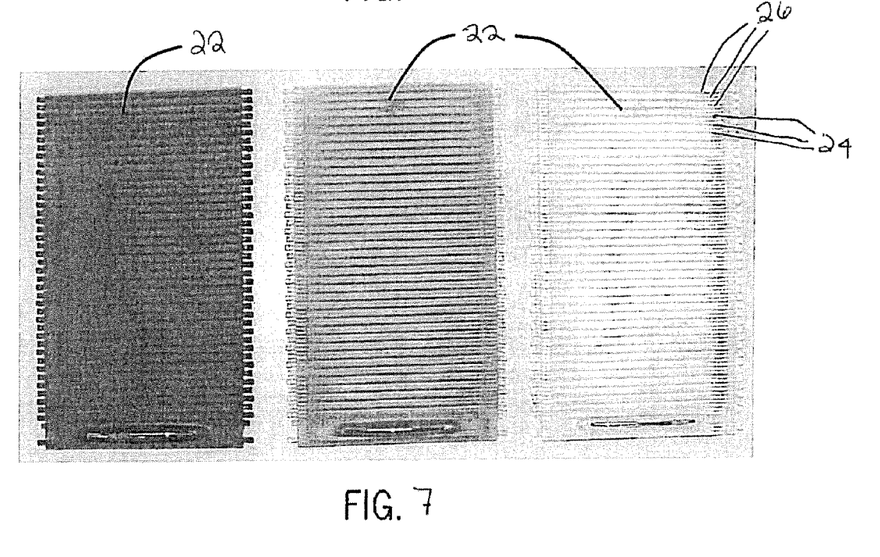
FIG. 7 is a photograph of the flexible components of FIG. 6 in a second lighting configuration.
Figure 8:
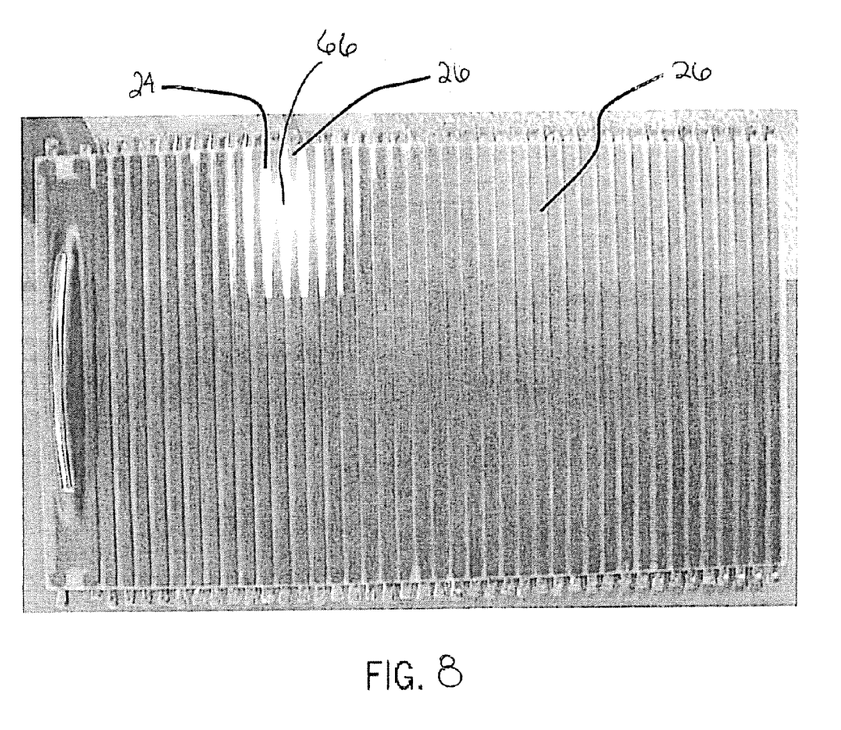
FIG. 8 is a photograph of one of the flexible components of FIGS. 5 and 6 with a light source behind the flexible component.

FIGS. 6-8 show the translucent nature of the flexible component 22. FIGS. 6 and 7 each show three exemplary embodiments of the flexible component 22. The flexible components 22 can be any of various colors and designs. The flexible component 22 shown on the left of FIGS. 6 and 7 and FIG. 8 includes slats 26 being opaque and a substrate 24 being translucent. The substrate 24 and slats 26 of the flexible component 22 in the middle of FIGS. 6 and 7 is translucent, and the flexible component 22 on the right is transparent. The flexible components 22 of FIG. 6 are shown in a first lighting environment and the same flexible components 22 are shown in FIG. 7 in a second lighting environment. Being at least partially transparent or translucent, the flexible components 22 have different appearances in the different lighting configurations.

As shown in FIG. 8, due to the translucent nature of the substrate 24 of the flexible component 22, a light source 66 can be seen through the substrate 24 of the flexible component 22. The light source 66 directs light through the translucent portions of the flexible component 22. Examples of the light source 66 include, but are not limited to, a light emitting diode, a high intensity discharge light, and a fluorescent light. The light source 66 can also include a light guide.

The storage component 20 is formed by providing the console including the side walls 40 defining the opening 28 to the interior space 30; providing the flexible component 22; and disposing the flexible component 22 along the opening 28.

The flexible component 22 is formed by coupling the substrate 24 to the slats 26. In one embodiment, an injection molding process is used to couple the substrate 24 to the slats 26, and the substrate 24 couples the slats 26 to one another. In one embodiment, the method includes a 2-shot injection molding process with a tool including two cavities. The tool closes over a first cavity and a first shot is injected into the first cavity to provide the plurality of slats 26. The first shot includes at least one of the slat polymers and optionally at least one of the slat fillers. The slats 26 remain in the tool as the tool opens, rotate, and closes over the second cavity. Next, the method includes injecting a second shot into a second cavity along the slats 26 so that the substrate 24 becomes chemically bonded to the plurality of slats 26 and couples the slats 26 to one another. The second shot includes at least one of the substrate polymers and optionally at least one of the substrate fillers. Alternatively, the flexible component 22 can be formed by another molding process or another process. The slat polymers, slat fillers, substrate polymers, and substrate fillers are selected to be compatible with one another, so that the substrate 24 and the slats 26 become chemically bonded in the mold. The slats 26 are also selected to provide a tensile strength of at least 5 MPa. The slat polymers, slat fillers, substrate polymers, and substrate fillers are also selected so that the flexible component 22 allows light to pass therethrough. Finally, the method includes disposing the light source 66 in the console.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A flexible component for a storage component of a vehicle, comprising:
   a substrate including at least one substrate polymer and having a surface tension,
   a plurality of slats including at least one slat polymer and having a surface tension differing from said surface tension of said substrate by no greater than 19 dynes per centimeter,
   said slats being chemically coupled to said substrate, and
   at least a portion of said chemically coupled slats and substrate allowing light to pass therethrough.

2. A flexible component as set forth in claim 1 wherein a portion of said plurality of slats allows light to pass therethrough.

3. A flexible component as set forth in claim 1 wherein a portion of said substrate allows light to pass therethrough.

4. A flexible component as set forth in claim 1 wherein both said plurality of slats and said substrate allow light to pass therethrough.

5. A flexible component as set forth in claim 1 wherein a portion of said chemically coupled slats and substrate is opaque.

6. A flexible component as set forth in claim 1 wherein a portion of said chemically coupled slats and substrate is transparent.

7. A flexible component as set forth in claim 1 wherein said surface tension of said slats differs from said surface tension of said substrate by not greater than 5 dynes per centimeter.

8. A flexible component as set forth in claim 1 wherein said slats have a surface tension of 38 dynes per centimeter to 50 dynes per centimeter according to test method ASTM D2578-09.

9. A flexible component as set forth in claim 1 wherein said slats have a surface tension of 18 dynes per centimeter to 37 dynes per centimeter according to test method ASTM D2578-09.

10. A flexible component as set forth in claim 1 wherein said slats have a tensile strength of at least 5 MPa according to test method ISO R527-2.

11. A flexible component as set forth in claim 1 wherein at least one of said polymers is selected from the group consisting of thermoplastic polyurethane (TPU), thermoplastic elastomer (TPE), thermoplastic elastomeric olefin (TPO), thermoplastic polyolefin elastomer (TEO), silicon, polyvinyl chloride (PVC), urethane, polypropylene (PP), polycarbonate (PC), acrylonitrile butadiene styrene (ABS), polycarbonate acrylonitrile butadiene styrene (PC/ABS), nylon, polybutylene terephthalate (PBT), and polyethylene terephthalate (PET).

12. A flexible component as set forth in claim 1 wherein said at least one substrate polymer is selected from the group consisting of: thermoplastic polyurethane (TPU), thermoplastic elastomer (TPE), thermoplastic elastomeric olefin (TPO), thermoplastic polyolefin elastomer (TEO), silicon, polyvinyl chloride (PVC), and urethane.

13. A flexible component as set forth in claim 1 wherein said at least one slat polymer is selected from the group consisting of: polypropylene (PP), polycarbonate (PC), acrylonitrile butadiene styrene (ABS), polycarbonate acrylonitrile butadiene styrene (PC/ABS), nylon, polybutylene terephthalate (PBT), silicon, and polyethylene terephthalate (PET).

14. A flexible component as set forth in claim 1 wherein said substrate includes said at least one substrate polymer in an amount of at least 60 weight percent, based on the total weight of said substrate.

15. A flexible component as set forth in claim 1 wherein said slats include said at least one slat polymer in an amount of at least 60 weight percent, based on the total weight of said slats.

16. A flexible component as set forth in claim 1 wherein said slats include a filler in an amount of up to 40 weight percent, based on the total weight of said slats.

17. A flexible component as set forth in claim 16 wherein said filler includes at least one of glass, fiberglass, talc, and wood.

18. A flexible component for a storage component of a vehicle, comprising:
a substrate including at least one substrate polymer selected from the group consisting of: thermoplastic polyurethane (TPU), thermoplastic elastomer (TPE), thermoplastic elastomeric olefin (TPO), thermoplastic polyolefin elastomer (TEO), silicon, polyvinyl chloride (PVC), polyurethane, and urethane,
a plurality of slats chemically coupled to said substrate,
said slats including at least one slat polymer selected from the group consisting of: polypropylene (PP), polycarbonate (PC), acrylonitrile butadiene styrene (ABS), polycarbonate acrylonitrile butadiene styrene (PC/ABS), nylon, polybutylene terephthalate (PBT), silicon, and polyethylene terephthalate (PET), and
at least a portion of said chemically coupled slats and substrate allowing light to pass therethrough.

19. A storage component of a vehicle comprising:
side walls presenting an interior space therebetween,
said side walls defining an opening to said interior space,
a flexible component disposed along said opening,
said flexible component including a substrate and a plurality of slats chemically coupled to said substrate,
said slats and said substrate each having a having a surface tension, wherein said surface tension of said slats differs from said surface tension of said substrate by not greater than 19 dynes per centimeters, and
at least a portion of said flexible component allowing light to pass therethrough.

20. A storage component as set forth in claim 19 including a light source disposed in said interior space for directing light through said flexible component.

* * * * *